(12) United States Patent
Argersinger

(10) Patent No.: US 8,033,576 B2
(45) Date of Patent: Oct. 11, 2011

(54) PIPE GUIDE FOR EXPANSION JOINT

(75) Inventor: Philip Argersinger, Cape Vincent, NY (US)

(73) Assignee: Flex-Hose Co. Inc., East Syracuse, NY (US)

( * ) Notice: Subject to any disclaimer, the term of this patent is extended or adjusted under 35 U.S.C. 154(b) by 353 days.

(21) Appl. No.: 11/871,195

(22) Filed: Oct. 12, 2007

(65) Prior Publication Data

US 2009/0096207 A1   Apr. 16, 2009

(51) Int. Cl.
F16L 21/00   (2006.01)

(52) U.S. Cl. ............................... 285/226; 285/114

(58) Field of Classification Search .............. 285/223, 285/226, 298, 299, 300, 301, 302
See application file for complete search history.

(56) References Cited

U.S. PATENT DOCUMENTS

| | | | | |
|---|---|---|---|---|
| 337,037 A * | 3/1886 | White | ............................ | 285/300 |
| 2,406,234 A * | 8/1946 | Marancik et al. | ................ | 285/96 |
| 2,661,963 A * | 12/1953 | Brown et al. | ..................... | 285/114 |
| 3,001,801 A * | 9/1961 | Downing | ........................ | 285/13 |
| 3,019,037 A * | 1/1962 | Caldwell | ......................... | 285/226 |
| 3,186,742 A * | 6/1965 | Frankel et al. | ................. | 285/114 |
| 3,241,867 A * | 3/1966 | Guarnaschelli | ................ | 285/109 |
| 3,642,060 A * | 2/1972 | Hlinka | ............................. | 165/47 |
| 3,692,337 A * | 9/1972 | Mischel | ......................... | 285/226 |
| 3,834,741 A * | 9/1974 | Drake | ............................ | 285/226 |
| 3,876,235 A * | 4/1975 | Flint | ................................ | 285/93 |
| 3,915,482 A * | 10/1975 | Fletcher et al. | ............... | 285/226 |
| 4,018,463 A * | 4/1977 | Campbell | .................... | 285/147.1 |
| 4,159,133 A * | 6/1979 | Belanger | ....................... | 285/114 |
| 4,350,372 A * | 9/1982 | Logsdon | ......................... | 285/45 |
| 4,489,962 A * | 12/1984 | Caumont et al. | .............. | 285/263 |
| 4,511,162 A * | 4/1985 | Broyles | ............................ | 285/93 |
| 4,749,215 A * | 6/1988 | Martin | ........................... | 285/187 |
| 4,779,650 A * | 10/1988 | Sargent et al. | ................ | 137/899 |
| 4,854,611 A * | 8/1989 | Press | ................................. | 285/3 |
| 5,286,063 A * | 2/1994 | Huston | ........................... | 285/11 |
| 5,299,841 A * | 4/1994 | Schaefer | ........................ | 285/299 |
| 5,407,237 A * | 4/1995 | Smolowitz | ...................... | 285/31 |
| 5,601,316 A * | 2/1997 | Totino et al. | ................... | 285/226 |
| 5,746,453 A * | 5/1998 | Roberts | ........................... | 285/47 |
| 5,797,628 A * | 8/1998 | Kuhn | ............................... | 285/49 |
| 6,065,780 A * | 5/2000 | Hiroshima | ...................... | 285/49 |
| 6,382,682 B1 * | 5/2002 | Taneda | ........................... | 285/300 |
| 6,409,226 B1 * | 6/2002 | Slack et al. | .................... | 285/226 |
| 6,659,511 B2 * | 12/2003 | Yoneyama et al. | ............ | 285/360 |
| 2002/0113435 A1 * | 8/2002 | McGrath | ........................ | 285/299 |
| 2005/0167978 A1 * | 8/2005 | Moses et al. | ................... | 285/223 |

* cited by examiner

*Primary Examiner* — Aaron Dunwoody

(74) *Attorney, Agent, or Firm* — George R. McGuire; Frederick J. M. Price; Bond Schoeneck & King

(57) ABSTRACT

A pipe guide is described for providing axial alignment to two pipes connected by an expansion joint. The pipe guide comprises a pipe guide sleeve that covers the expansion joint and is connected at its first end to the first pipe. It also comprises a guide ring that is connected to the second pipe and slidably engages the interior of the pipe guide sleeve. In one embodiment, the pipe guide also comprises restraint rods to limit the axial extension and compression of the pipe guide.

3 Claims, 2 Drawing Sheets

PIPE GUIDE FOR EXPANSION JOINT

BACKGROUND OF THE INVENTION

The present invention relates to an improved pipe guide for expansion joints, which has protective features.

SUMMARY OF THE INVENTION

In some pipe networks, flexible expansion joints are used to compensate for expansion and contraction of pipes in networks that convey fluids having a wide temperature range.

Typically, such joints require a set of pipe guides positioned on either side of the expansion joint and mounted to nearby fixed structural elements to maintain the axial alignment of the pipe sections being joined. Positioning of such pipe guides and anchoring them to suitable structure to support the pipe and joint is occasionally difficult. What is needed is an improved pipe guide that eliminates the need for pipe guides adjacent an expansion joint.

Additionally, if a flexible expansion joint fails, the fluid leaking from the joint can be hazardous to personnel responsible for repairing the failed joint. What is needed is an improved pipe guide that provides protection from leaking fluid.

It is therefore a principal object and advantage of the present invention to provide an improved pipe guide that maintains axial alignment of connected pipe sections while eliminating the need for pipe guides positioned on either side of the expansion joint that connects the pipe sections. It is also an object and advantage of the present invention to provide an improved pipe guide that protects against leaking fluid if the expansion joint in the pipe guide fails.

In accordance with the foregoing objects and advantages, the present invention provides an improved pipe guide comprising a first guide ring fixed to the exterior of a first pipe, a second guide ring fixed to the exterior of a second pipe and a pipe guide that is fixed to the first guide ring and also surrounds and slidably engages the second guide ring.

BRIEF DESCRIPTION OF THE DRAWINGS

The present invention will be more fully understood and appreciated by reading the following Detailed Description in conjunction with the accompanying drawings, in which.

DETAILED DESCRIPTION

Figure 1:
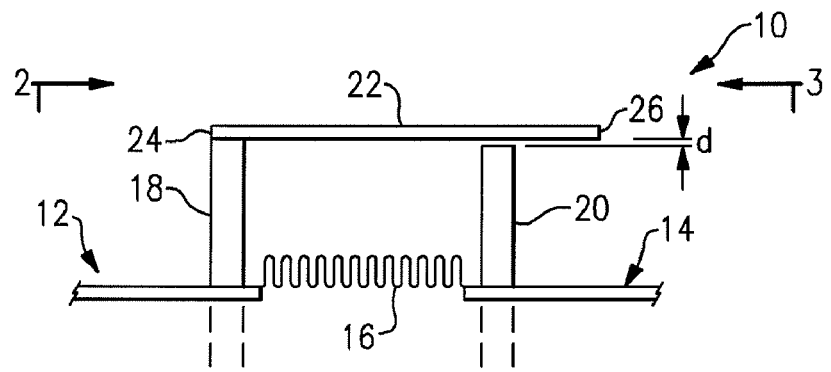
FIG. 1 is a sectional side elevation view of a pipe guide according to the present invention.
Figure 1:
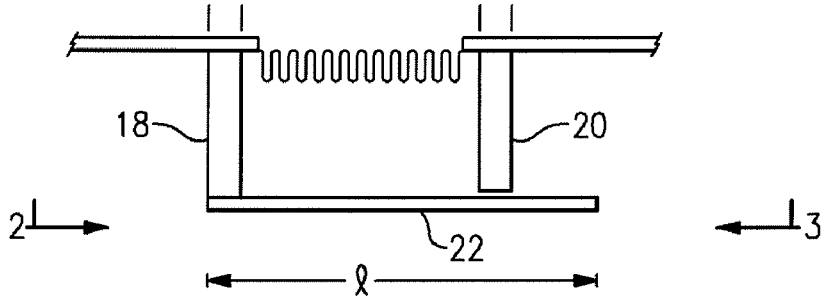
Figure 4:
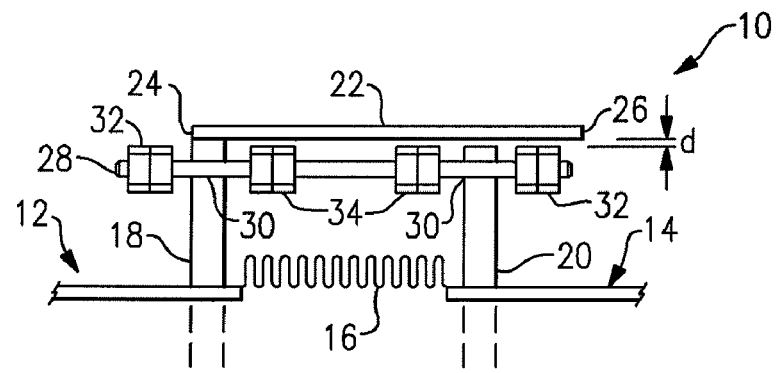
FIG. 4 is a sectional side elevation view of a pipe guide according to another embodiment of the present invention.
Figure 4:
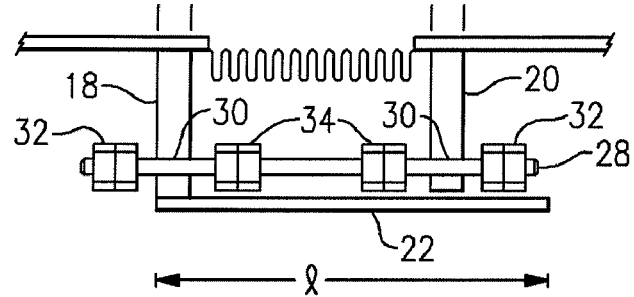
Figure 2:
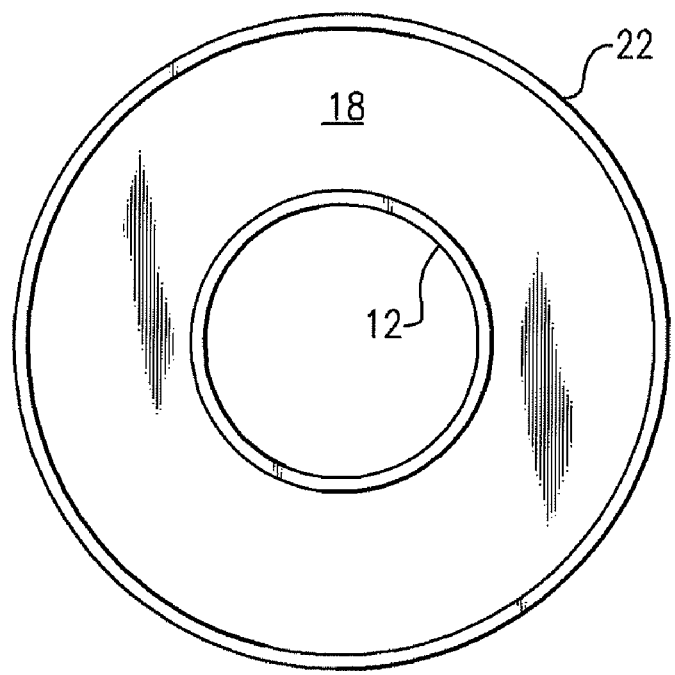
FIG. 2 is an end elevation view of the pipe guide in FIG. 1, viewed from line 2.
Figure 3:
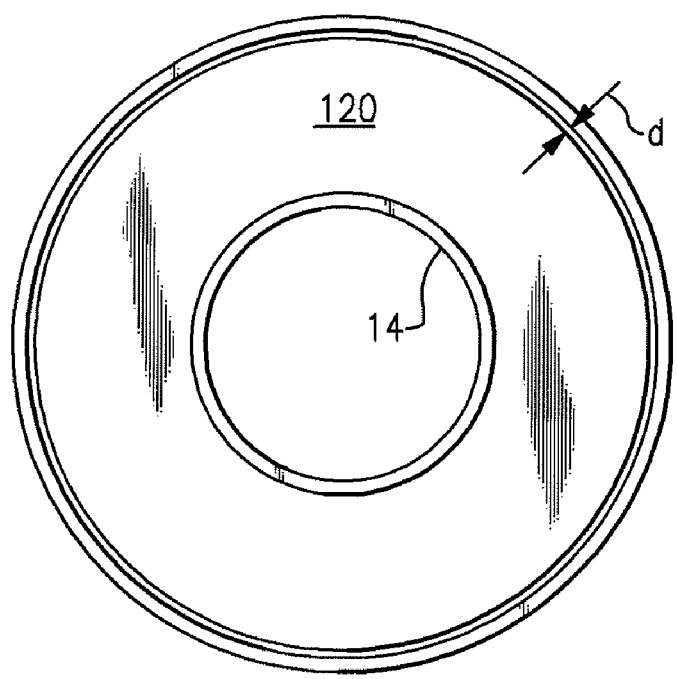
FIG. 3 is an end elevation view of the pipe guide in FIG. 1, viewed from line 3.

Referring now to the drawings, wherein like reference numerals refer to like parts throughout, there is seen in FIG. 1 a pipe guide 10 for axially aligning first pipe 12 and second pipe 14. First pipe 12 and second pipe 14 are not part of pipe guide 10. First pipe 12 and second pipe 14 are connected to each other by expansion joint 16.

Pipe guide 10 comprises first guide ring 18, second guide ring 20 and pipe guide sleeve 22. First guide ring 18 and second guide ring 20 are attached, respectively, to first pipe 12 and second pipe 14. First guide ring 18 and second guide ring 20 are disks with a central aperture sized to engage (and connect to) respective pipes 12, 14. According to one embodiment, guide rings 18, 20 are solid.

Pipe guide shroud 22 is tubular in shape and has a first end 24 and second end 26. First end 24 is connected to the outer diameter of first guide ring 18. The length 1 of pipe guide shroud 22 is selected to completely cover expansion joint 16 and extend at least as far as second guide ring 20 when expansion joint 16 is at its maximum extension.

The internal diameter of pipe guide shroud 22 and the outer diameter of second guide ring 20 are selected so that second guide ring 20 slides freely and securely within pipe guide sleeve 22. The dimension d between the internal diameter of pipe guide shroud 22 and the outer diameter of second guide ring 20 must be sufficiently large to permit second guide ring 20 to slide freely as pipes 12, 14 move axially relative to one another. Dimension d must also be small enough that pipe guide 10 provides substantially linear alignment to pipes 12, 14 when they are connected using pipe guide 10. If dimension d is too large, second guide ring 20 will fit loosely within pipe guide shroud 22 and pipe guide 10 will not provide sufficient rigidity to the connection between first pipe 12 and second pipe 14.

According to another embodiment, guide rings 18, 20 are perforated. According to this embodiment, pipe guide 10 is used to provide axial alignment to pipes 12, 14, and provides shielding protection from hazardous fluid that may be leaking from expansion joint 16, but it does not operate to contain the leaking hazardous fluid within pipe guide 10.

According to another embodiment, each of guide rings 18, 20 includes a plurality of restraint rod holes 30, for receiving a plurality of restraint rods 28. Each restraint rod 28 passes through a restraint rod hole 30 in first guide ring 18 and a restraint rode hole 30 in second guide ring 20. Each restraint rod 28 includes outer limit stops 32 and inner limit stops 34. Limit stops 32, 34 can be selectively positioned to limit the relevant axial movement of first pipe 12 and second pipe 14. In one embodiment, restraint rods 28 are threaded rods and each limit stop 32, 34 consists of a pair of nuts that can be selectively fixed in position by tightening them against each other.

What is claimed is:

1. A pipe guide for aligning pipes, said pipe guide comprising:
   a first guide ring encircling and fixed in position relative to a first pipe, wherein said first pipe has a connection with an expansion joint, proximate the first pipe's connection with the expansion joint;
   a second guide ring encircling and fixed in position relative to a second pipe, wherein said second pipe has a connection with the expansion joint, proximate the second pipe's connection with the expansion joint wherein said second guide ring does not extend beyond said second pipe's connection with the expansion joint;
   a tubular pipe guide shroud having a first end and a second end, said first end fixedly connected to said first guide ring;
   wherein said second guide ring's outer perimeter slides within the interior of said pipe guide shroud; and
   a restraint rod for limiting the axial extension and compression of the pipe guide.

2. The pipe guide of claim 1 wherein said restraint rod passes through first guide ring and second guide ring and includes interior and exterior stops for limiting the axial extension and compression of pipe guide.

3. A pipe guide for aligning pipes, said pipe guide comprising:

a first alignment and containment member fixed to a first pipe, wherein said first pipe has a connection with an expansion joint, proximate the first pipe's connection with the expansion joint, said first alignment and containment member's longitudinal dimension extending beyond said expansion joint's connection with a second pipe;

a second alignment and containment member fixed to the second pipe, wherein said second pipe has a connection with the expansion joint, proximate the second pipe's connection to the expansion joint, said second alignment and containment member slidably engaging the interior of said first alignment and containment member; and a restraint rod having stops for limiting the axial extension and compression of the pipe guide.

* * * * *